(12) United States Patent
Lin

(10) Patent No.: US 7,258,039 B2
(45) Date of Patent: Aug. 21, 2007

(54) HANDLE-ADJUSTING DEVICE FOR ADJUSTING THE POSITION OF A HANDLE RELATIVE TO A VEHICLE FRAME

(75) Inventor: Samuel Lin, Chia Yi Hsien (TW)

(73) Assignee: Sunpex Technology Co., Chia Yi (TW)

( * ) Notice: Subject to any disclaimer, the term of this patent is extended or adjusted under 35 U.S.C. 154(b) by 604 days.

(21) Appl. No.: 10/742,083

(22) Filed: Dec. 19, 2003

(65) Prior Publication Data

US 2005/0132838 A1 Jun. 23, 2005

(51) Int. Cl.
*B62K 21/16* (2006.01)

(52) U.S. Cl. .................................... 74/551.3

(58) Field of Classification Search .... 74/551.1–551.7, 74/527, 529, 531, 545, 546, 547; 482/42, 482/908; 280/47.315, 655.1; 403/322.4
See application file for complete search history.

(56) References Cited

U.S. PATENT DOCUMENTS 4,913,396 A * 4/1990 Dalebout et al. ........... 248/649
6,176,337 B1 * 1/2001 McConnell et al. ........ 180/208
6,332,621 B1 * 12/2001 Wu ........................ 280/87.041
2002/0151414 A1 * 10/2002 Baker .......................... 482/57
2005/0061103 A1 * 3/2005 Lin ........................... 74/551.3
2005/0109152 A1 * 5/2005 Hsu ........................... 74/551.3

* cited by examiner

Primary Examiner—Richard Ridley
Assistant Examiner—Terence Boes
(74) Attorney, Agent, or Firm—McNees Wallace & Nurick LLC

(57) ABSTRACT

A handle-adjusting device for adjusting position of a handle relative to a vehicle frame includes a valve cylinder with a valve rod, and a control rod that is formed with a pressing face and a release face. When the control rod is operated to align the pressing face with an upper end of the valve rod, the valve rod is disposed at a retracted position so as to enable rotation of the handle relative to the vehicle frame. When the control rod is operated to align the release face with the upper end of the valve rod, the valve rod is disposed at the extended position so as to prevent rotation of the handle relative to the vehicle frame.

4 Claims, 10 Drawing Sheets

HANDLE-ADJUSTING DEVICE FOR ADJUSTING THE POSITION OF A HANDLE RELATIVE TO A VEHICLE FRAME

BACKGROUND OF THE INVENTION

1. Field of the Invention

This invention relates to a handle-adjusting device, and more particularly to a handle-adjusting device for adjusting the position of a handle relative to a vehicle frame.

2. Description of the Related Art

Referring to FIG. 1, a conventional handle-adjusting device 13 is disposed between a vehicle frame 11 and a handle 12 that has an upright support rod 121 and a handlebar 122 connected fixedly to an upper end of the support rod 121. The vehicle frame 11 is formed with a fixed bracket 111. The handle-adjusting device 13 includes a mounting seat 14 connected pivotally to the support rod 121, a pressing lever 15 connected pivotally to the mounting seat 14 at a front end thereof, and a valve cylinder 16 that includes a cylinder body 160 having a lower end connected pivotally to the bracket 111, a movable rod 160' connected telescopically to the cylinder body 160 and having an upper end connected fixedly to the mounting seat 14, and a valve rod 161 disposed axially and movably within the movable rod 160' and biased to press against a front end portion of the pressing lever 15. As such, the valve rod 161 is biased to an extended position, where the pressing lever 15 is perpendicular to the valve rod 161 and where relative movement between the cylinder body 160 and the movable rod 160' is prevented. When the pressing lever 15 is turned downwardly to an inclined position as shown by the phantom lines so as to move the valve rod 161 to a retracted position, relative movement between the cylinder body 160 and the movable rod 160' is permitted so that the handle 12 can be rotated relative to the bracket 111. Thereafter, the pressing lever 15 is released so that the valve rod 161 is biased to the extended position, thereby positioning the handle 12 relative to the vehicle frame 11. The aforesaid conventional handle-adjusting device 13 suffers from a drawback that it is difficult to adjust the position of the handle 12 in view of the fact that the operator has to hold the pressing lever 15 at the inclined position with one hand while he or she is rotating the handle 12 with the other hand. That is, there is a need for the operator to operate the handle-adjusting device 13 with both hands.

SUMMARY OF THE INVENTION

The object of this invention is to provide a handle-adjusting device for adjusting the position of a handle relative to a vehicle frame, which can be operated with only one hand.

According to this invention, a handle-adjusting device for adjusting the position of a handle relative to a vehicle frame includes a valve cylinder with a valve rod, and a control rod that is formed with a pressing face and a release face. When the control rod is operate to align an upper end of the valve rod with the pressing face, the valve rod is disposed at a retracted position so as to enable rotation of the handle relative to the vehicle frame. When the control rod is operated to align the upper end of the valve rod with the release face, the valve rod is disposed at the extended position so as to prevent rotation of the handle relative to the vehicle frame. As such, the control rod can be operated to align the upper end of the valve rod with the pressing face of the control rod so as to permit adjustment of position of the handle, after which the control rod is operated to align the upper end of the valve rod with the release face of the control rod so as to position the handle relative to the vehicle frame.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
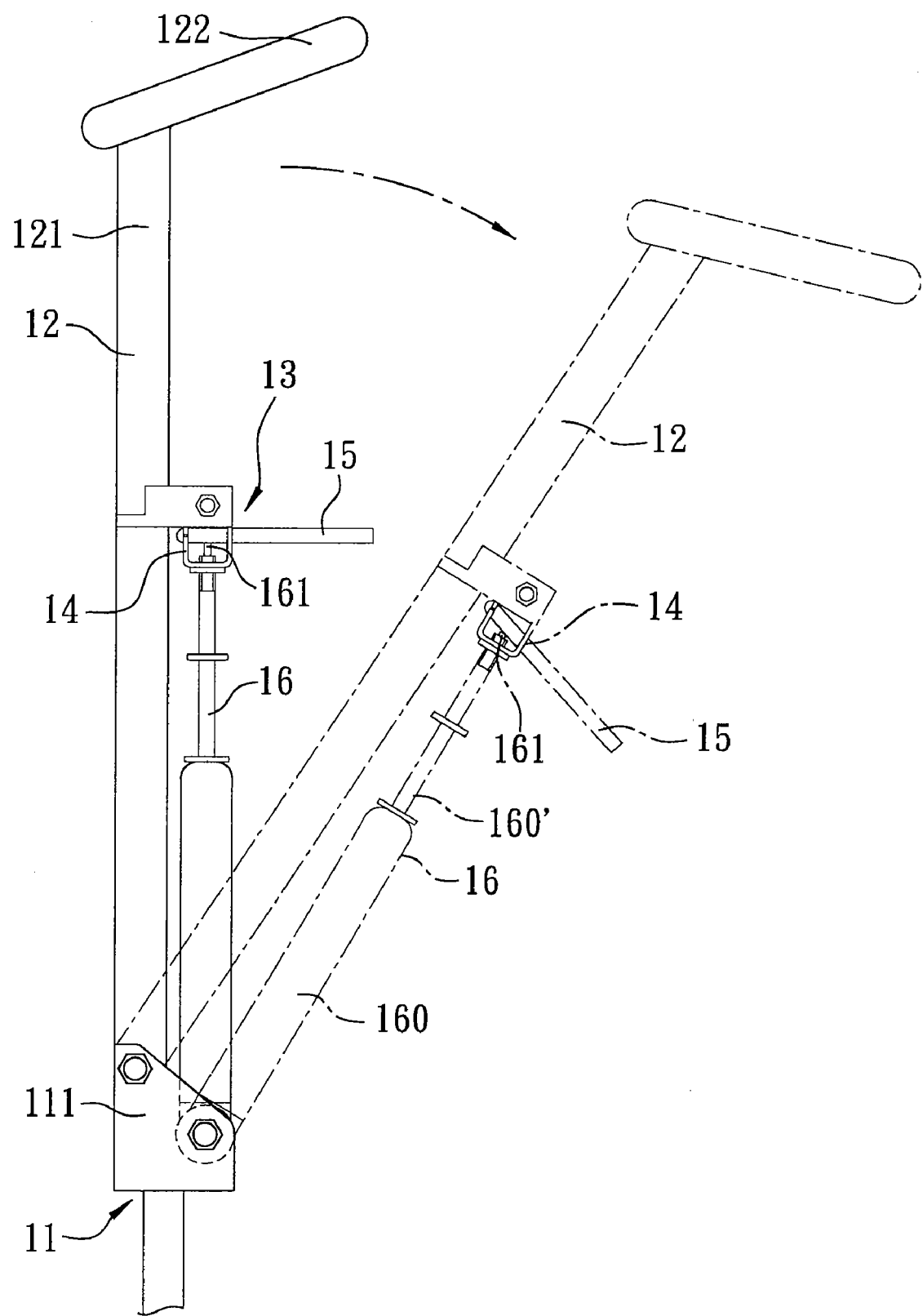
FIG. 1 illustrates how a conventional handle-supporting device is operated to adjust the position of a handle relative to a vehicle frame.

Before the present invention is described in greater detail in connection with the preferred embodiments, it should be noted that similar elements and structures are designated by like reference numerals throughout the entire disclosure.

Figure 2:
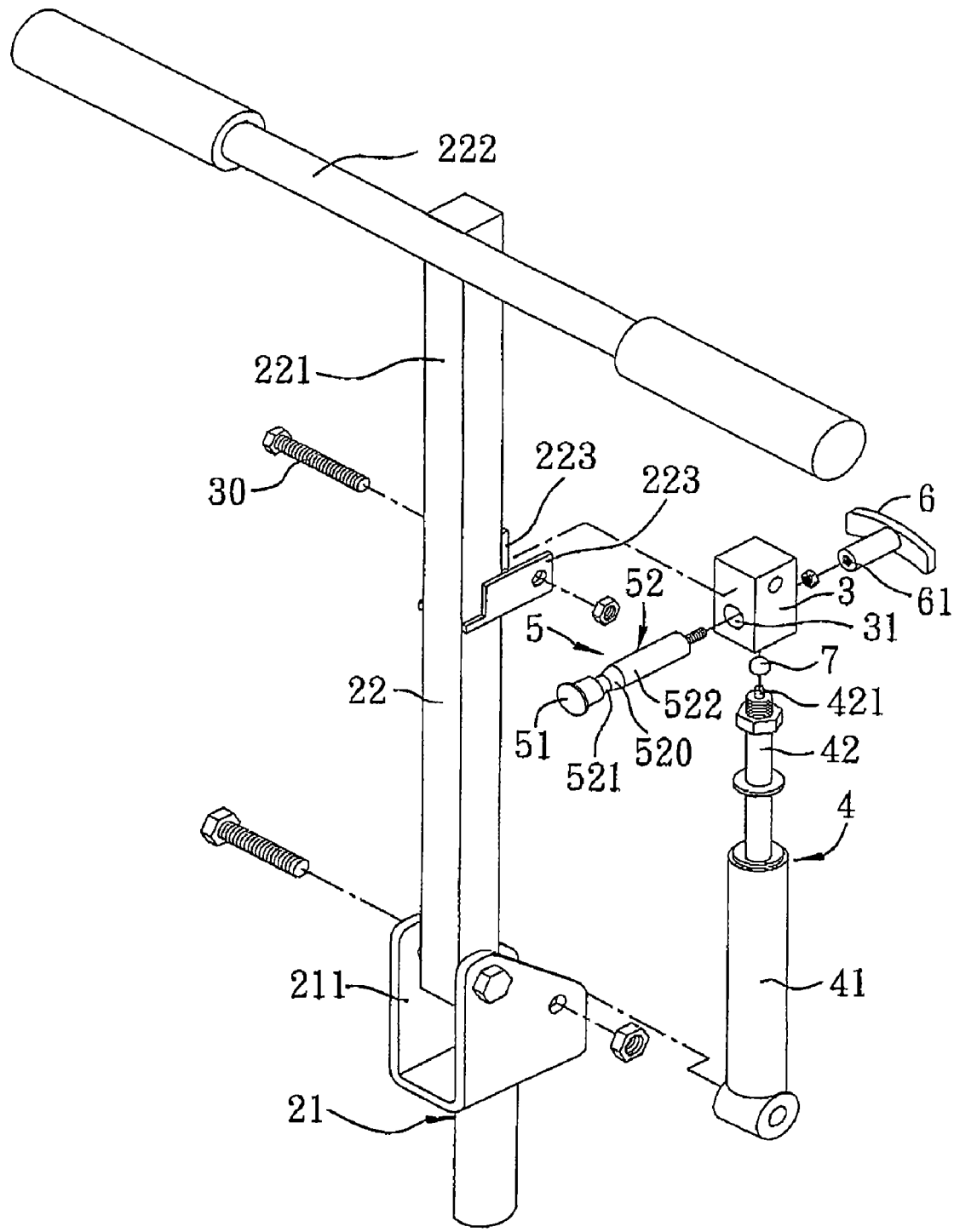
FIG. 2 is a partly exploded perspective view of the first preferred embodiment of a handle-supporting device for adjusting the position of a handle relative to a vehicle frame according to this invention.
Figure 3:
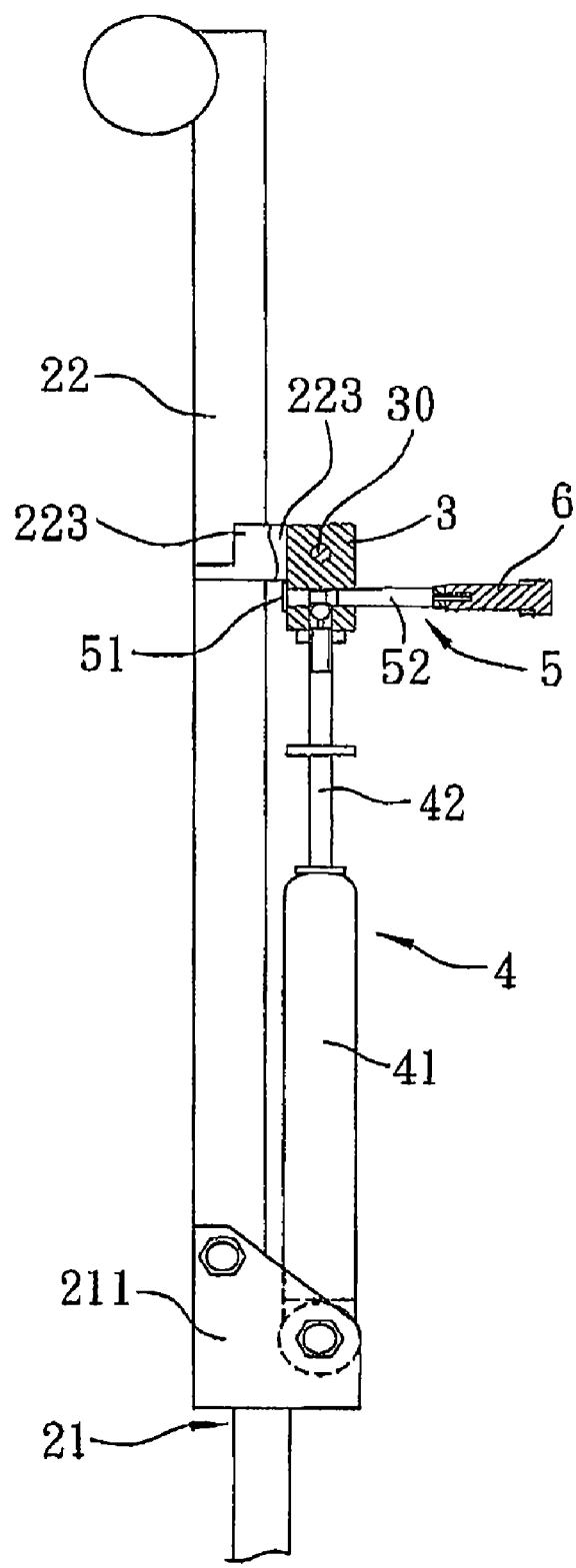
FIG. 3 is a partly sectional side view of the first preferred embodiment.
Figure 4:
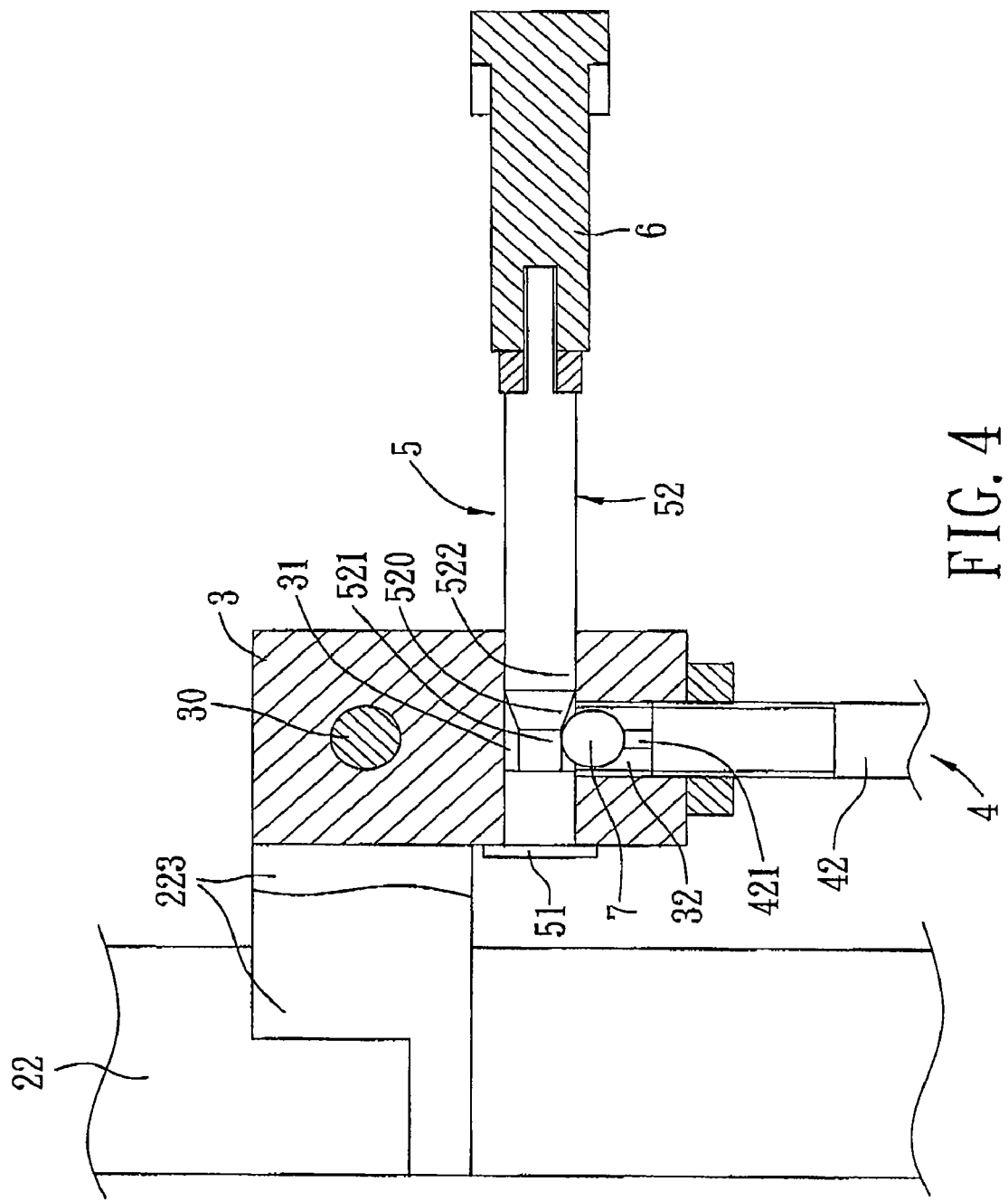
FIG. 4 is a fragmentary, partly sectional side view of the first preferred embodiment, illustrating how a valve rod is disposed at an extended position.

Referring to FIGS. 2, 3, and 4, the first preferred embodiment of a handle-adjusting device for adjusting the position of a handle 22 relative to a vehicle frame 21 is shown to include a mounting seat 3, an upright valve cylinder 4, a control rod 5, a T-shaped knob 6, and a ball 7. The vehicle frame 21 is formed with a fixed U-shaped bracket 211. The handle 22 includes an upright support rod 221 connected pivotally to the bracket 211 at a lower end thereof, a handlebar 222 connected fixedly to an upper end of the support rod 221, and two aligned vertical plates 223 connected fixedly to and extending rearwardly from the support rod 221.

The mounting seat 3 is disposed behind the support rod 221, is connected rotatably to the vertical plates 223 by a horizontal pivot pin 30 in a known manner, and has a frontwardly and rearwardly extending intermediate hole 31 formed therethrough so as to permit extension of a front end portion of the control rod 5 therethrough, a planar bottom surface, and a threaded lower hole 32. The lower hole 32 has an upper end communicated with the intermediate hole 31, and a lower end formed in the bottom surface.

The upright valve cylinder 4 is configured as a pneumatic cylinder, and includes a cylinder body 41, a movable rod 42, and a valve rod 421. The cylinder body 41 has a lower end connected pivotally to the bracket 211. The movable rod 42 is disposed axially and movably within the cylinder body 41, and has an externally threaded upper end that projects upwardly from the cylinder body 41 and that engages the threaded lower hole 32 in the mounting seat 3. The valve rod 421 is disposed axially and movably within the movable rod 42 in a known manner, has an upper end projecting outwardly from the movable rod 42 and extending into the lower hole 32 in the mounting seat 3, and is movable relative to the movable rod 42 between an extended position shown in FIG. 4, where the movable rod 42 is fixed relative to the cylinder body 41, and a retracted position shown in FIG. 5, where the movable rod 42 can move within the cylinder body 41. The valve rod 421 is biased to the extended position in a known manner.

The control rod 5 has an outward flange 51 disposed at a front distal end thereof, and a rod body 52 that is formed integrally with the outward flange 51. The rod body 52 is disposed movably within the intermediate hole 31 in the mounting seat 3, and is formed with an annular release face 521, an annular pressing face 522 that is disposed behind the release face 521 and that has a diameter larger than that of the release face 521, and a frustoconical face 520 that is disposed between and that interconnects the release face 521 and the pressing face 522. The outward flange 51 has a rear side surface abutting against a front surface of the mounting seat 3 so as to prevent rearward removal of the control rod 5 from the intermediate hole 31 in the mounting seat 3.

The knob 6 has an internally threaded front end 61 engaging an externally threaded rear end of the control rod 5, and is sized so as to prevent the knob 6 from moving into the intermediate hole 31 in the mounting seat 3.

The ball 7 is disposed within the lower hole 32 in the mounting seat 3 between the upper end of the valve rod 421 and the rod body 52 of the control rod 5. The upper end of the valve rod 421 is biased to press the ball 7 against the control rod 5.

Figure 5:
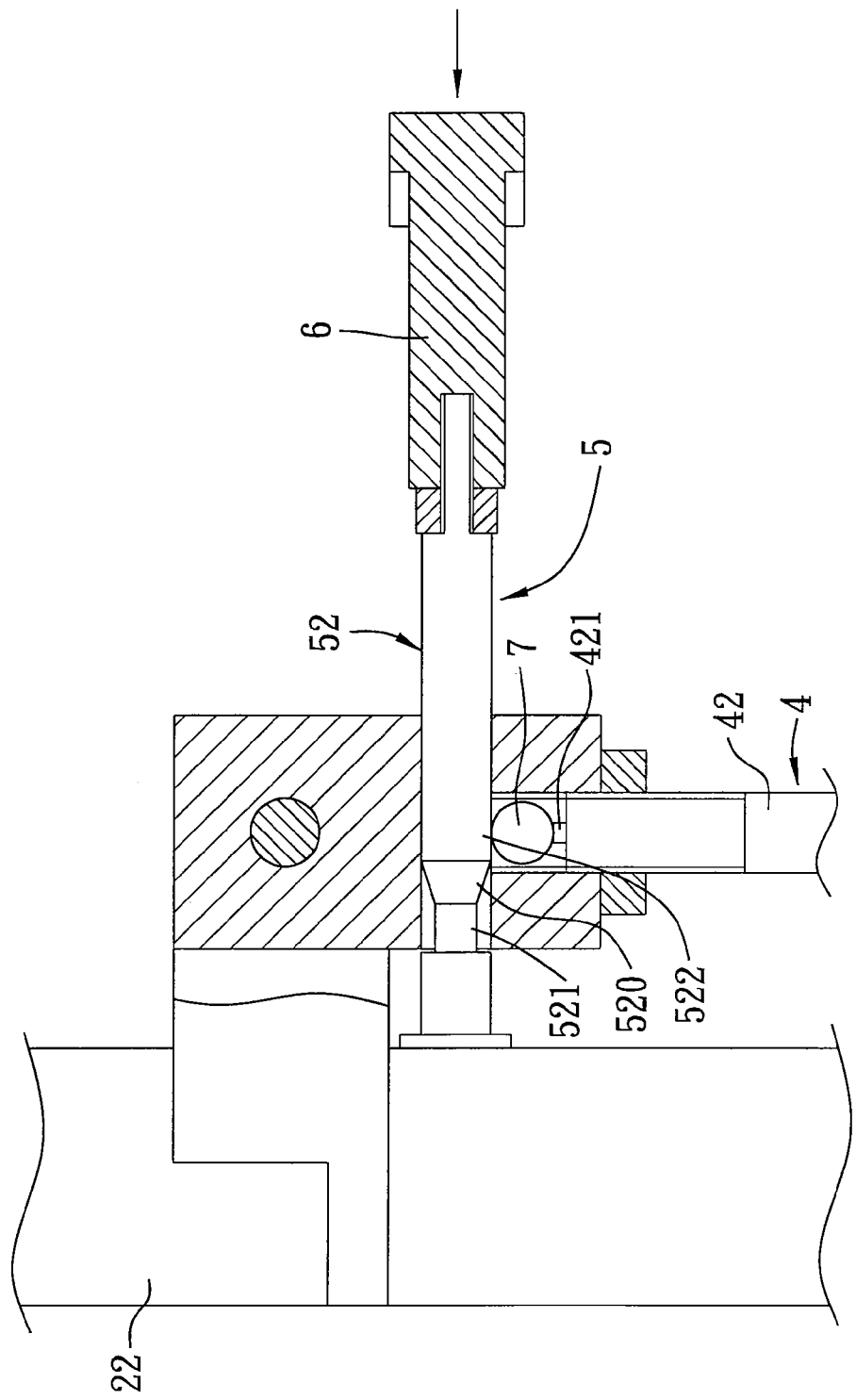
FIG. 5 is a fragmentary, partly sectional side view of the first preferred embodiment, illustrating how the valve rod is disposed at a retracted position.

The control rod 5 is movable on the mounting seat 3 to align the upper end of the valve rod 421 with a selected one of the release face 521 and the pressing face 522 of the control rod 5. Referring to FIG. 4, when the release face 521 of the control rod 5 is aligned with the upper end of the valve rod 421, the valve rod 421 is disposed at the extended position so as to prevent rotation of the handle 22 relative to the vehicle frame 21 (see FIG. 3). Referring to FIG. 5, when the pressing face 522 of the control rod 5 is aligned with the upper end of the valve rod 421, the valve rod 421 is disposed at the retracted position so as to enable rotation of the handle 22 relative to the vehicle frame 21 (see FIG. 3).

When it is desired to adjust the position of the handle 22, the control rod 5 can be moved relative to the mounting seat 3 to align the upper end of the valve rod 421 with the pressing face 522 of the control rod 5 so as to permit adjustment of the position of the handle 22. Thereafter, the control rod 5 is moved relative to the mounting seat 3 to align the upper end of the valve rod 421 with the release face 521 of the control rod 5 so as to position the handle 22 relative to the vehicle frame 21 (see FIG. 3). As such, the operator can adjust the position of the handle 22 with only one hand.

Figure 6:
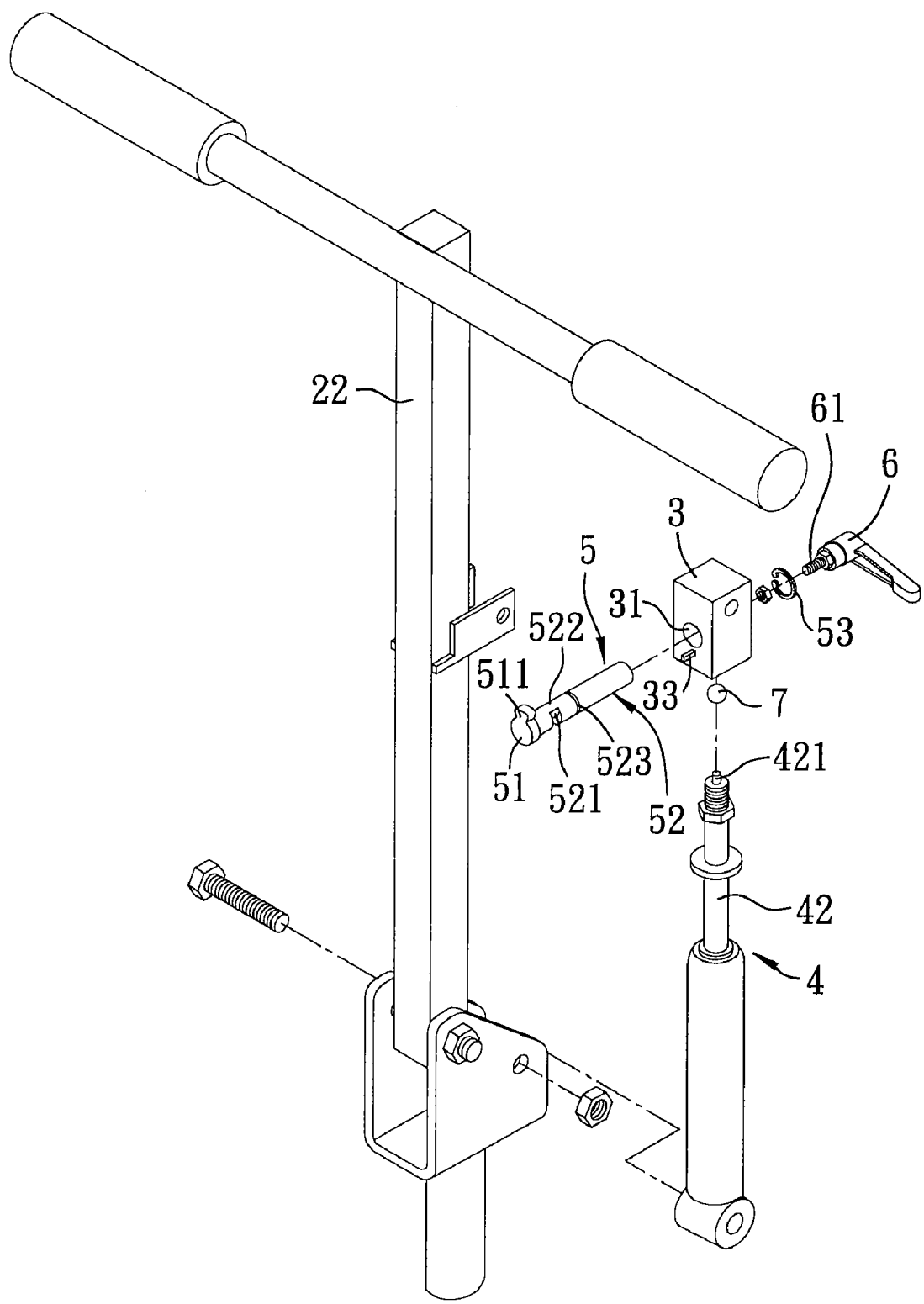
FIG. 6 is a partly exploded perspective view of the second preferred embodiment of a handle-supporting device for adjusting the position of a handle relative to a vehicle frame according to this invention.
Figure 7:
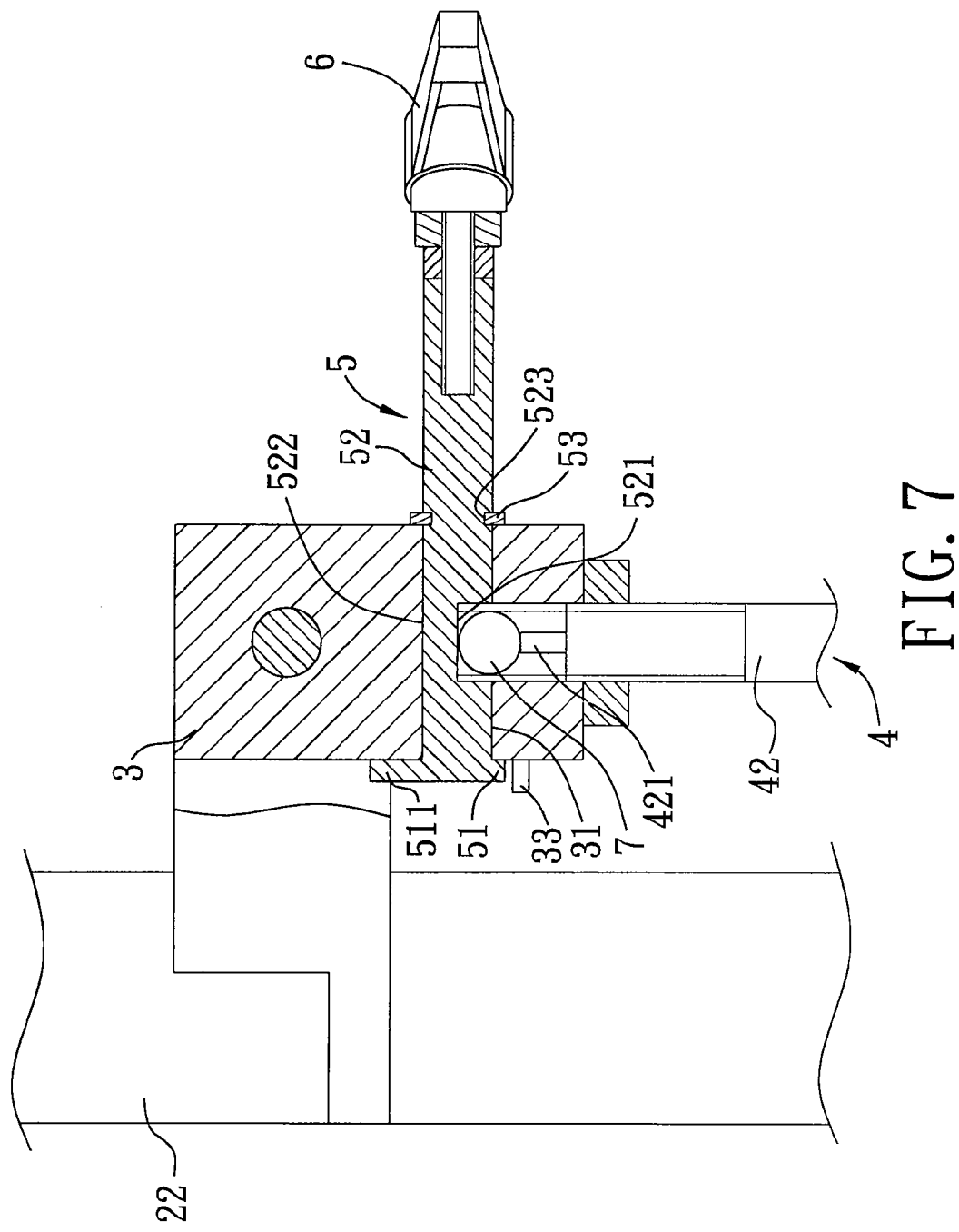
FIG. 7 is a fragmentary, partly sectional side view of the second preferred embodiment, illustrating how a valve rod is disposed at an extended position.

FIGS. 6 and 7 show the second preferred embodiment of a handle-supporting device for adjusting the position of a handle 22 relative to a vehicle frame 21, which includes a mounting seat 3, a valve cylinder 4, a control rod 5, an L-shaped rotary knob 6, and a ball 7. The vehicle frame 21, the handle 22, the valve cylinder 4, and the ball 7 are similar to those of the first preferred embodiment in construction. Unlike the first preferred embodiment, the control rod 5 has an outer surface that is formed with an annular groove 523. A C-shaped retaining ring 53 is received within the annular groove 523 in the control rod 5, and abuts against a rear surface of the mounting seat 3 so as to prevent movement of the control rod 5 relative to the mounting seat 3 and so as to permit rotation of the control rod 5 relative to the mounting seat 3. The control rod 5 has a cylindrical rod body 52 that is disposed within the intermediate hole 31 in the mounting seat 3 and that is formed with a semi-cylindrical groove, which is defined by a planar bottom wall constituting the release face 521. The pressing face 522 is shaped as a curved surface that has a uniform curvature radius, that aligned with the release face 521 along a transverse direction of the control rod 5, and that has two opposite sides which are connected respectively to two opposite sides of the release face 521.

Figure 8:
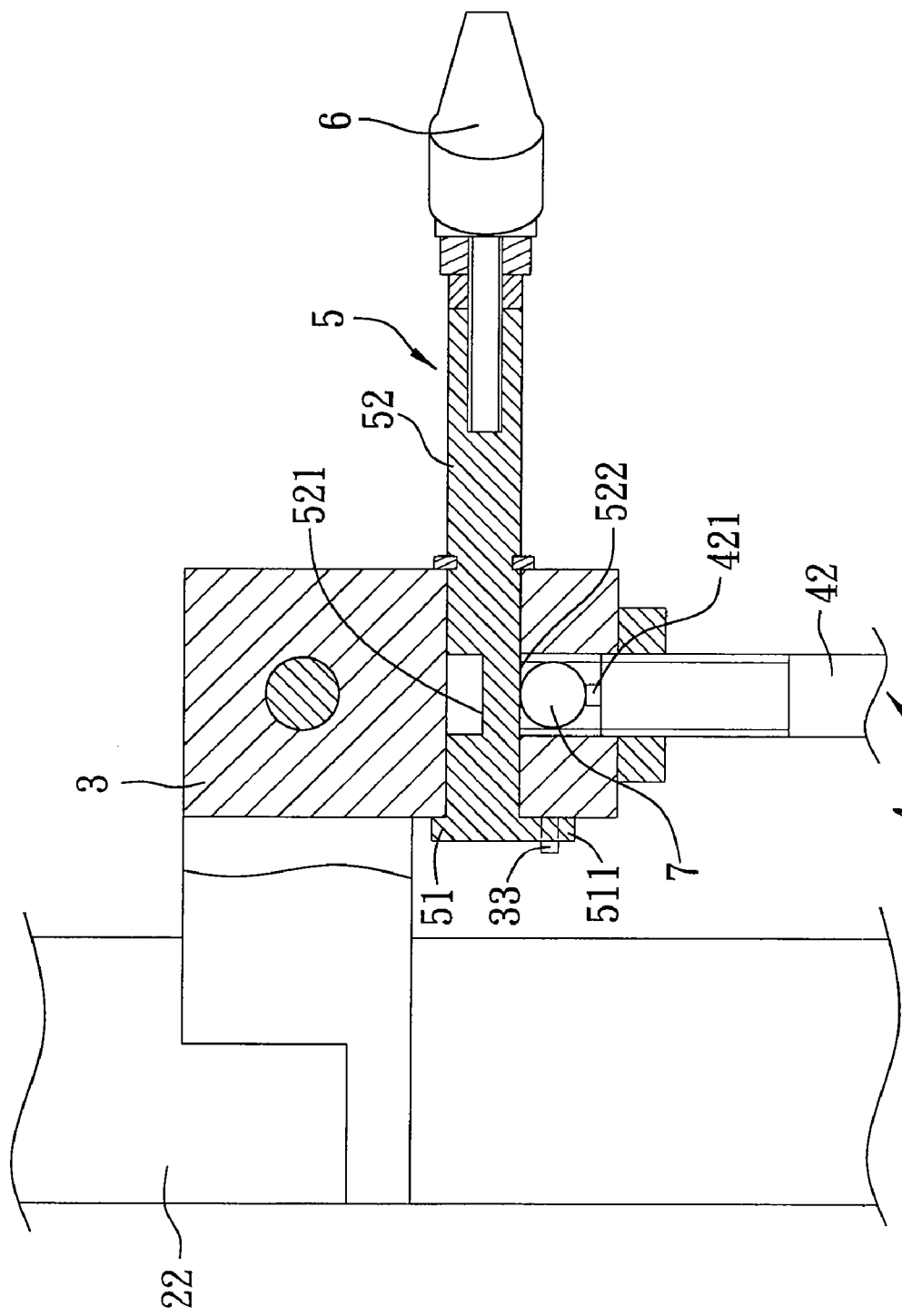
FIG. 8 is a fragmentary, partly sectional side view of the second preferred embodiment, illustrating how the valve rod is disposed at a retracted position.

The front surface of the mounting seat 3 is formed with a stop rod 33 extending perpendicularly therefrom. The outward flange 51 of the control rod 5 is formed with a limiting projection 511 that extends radially and outwardly therefrom and that is rotatable relative to the mounting seat 3 to abut against the stop rod 33 of the mounting seat 3 when the pressing face 522 of the control rod 5 is aligned with the upper end of the valve rod 421, as shown in FIG. 8. The L-shaped rotary knob 6 has an externally threaded front end 61-engaging an internally threaded rear end of the control rod 5.

Figure 9:
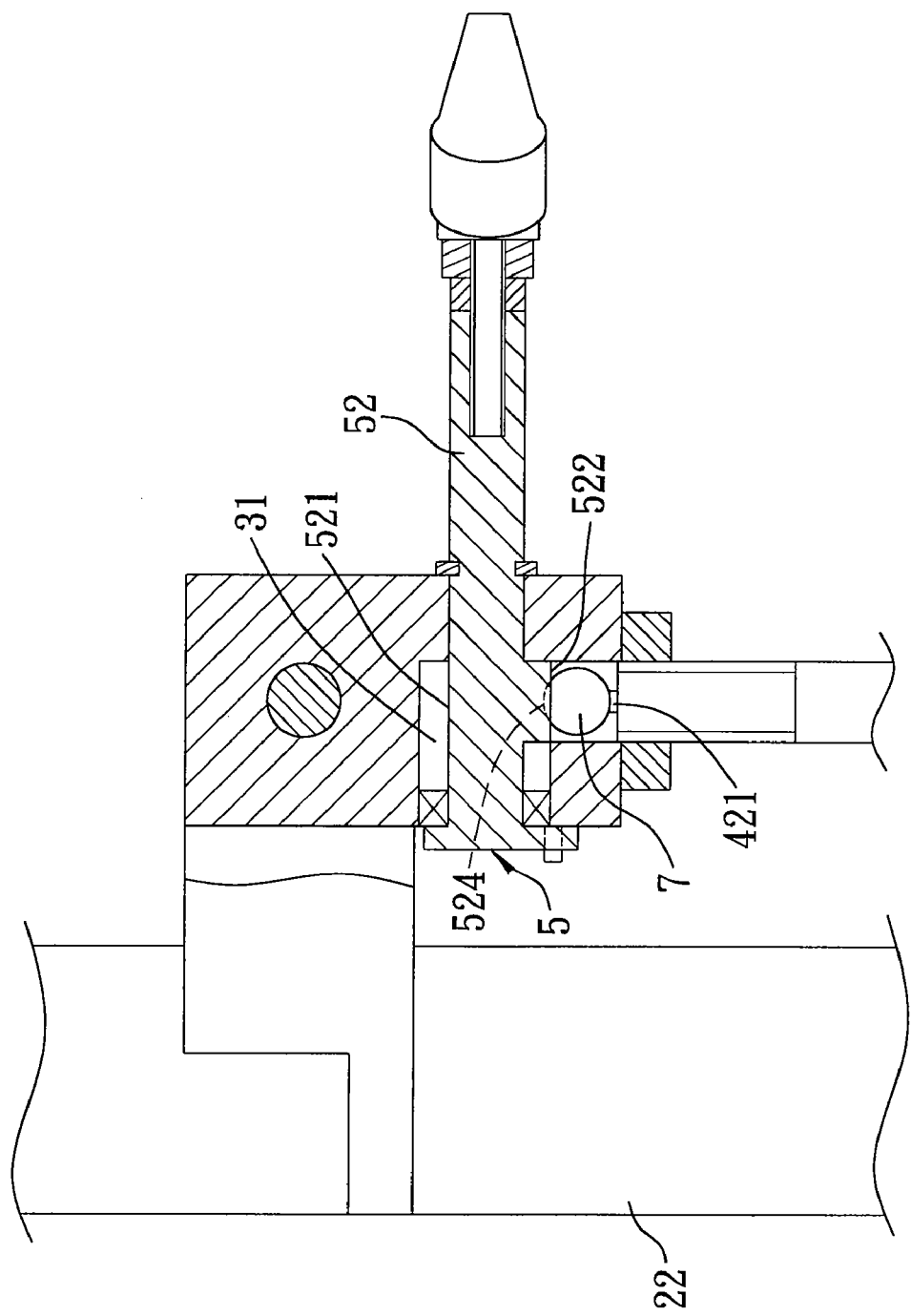
FIG. 9 is a fragmentary, partly sectional side view of the third preferred embodiment of a handle-supporting device for adjusting the position of a handle relative to a vehicle frame according to this invention.
Figure 10:
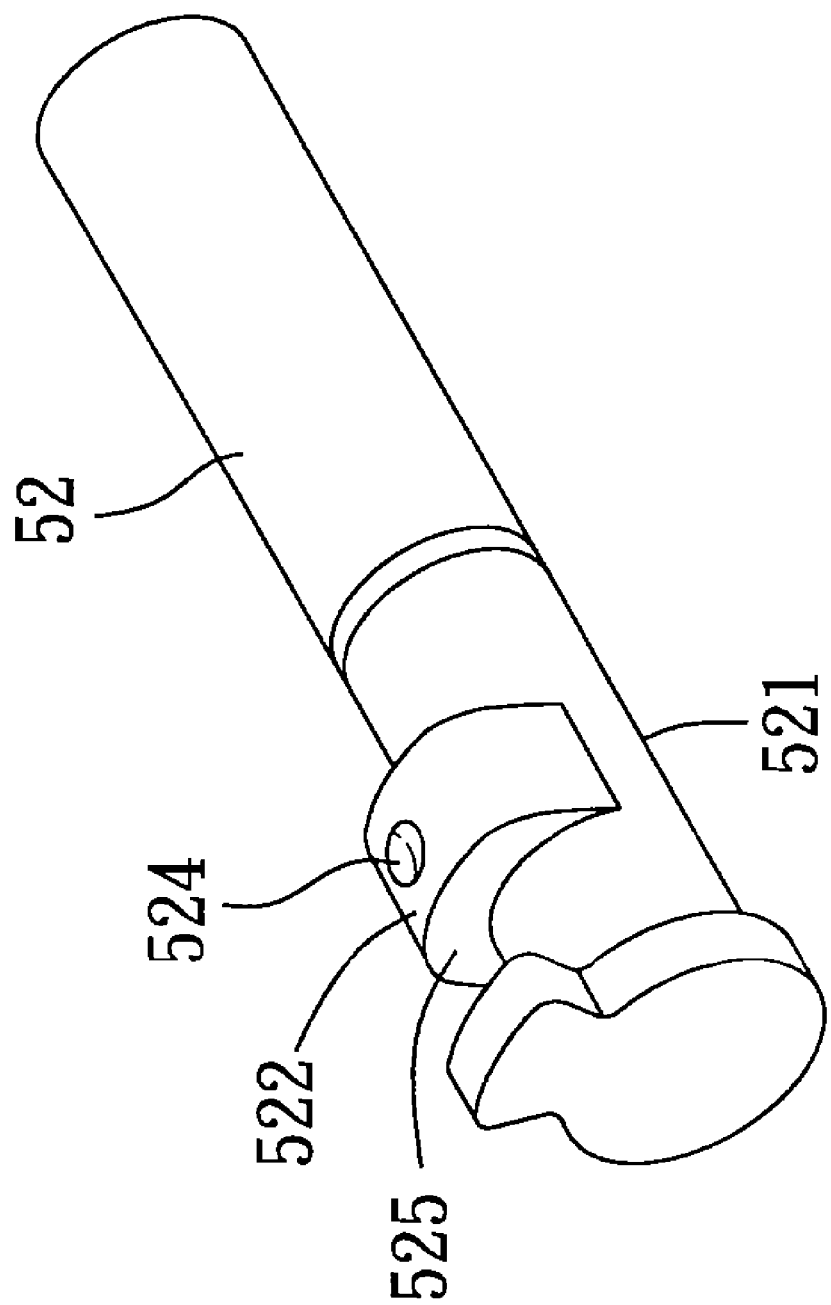
FIG. 10 is a perspective view of a control rod of the third preferred embodiment.

FIGS. 9 and 10 show the third preferred embodiment of a handle-supporting device for adjusting the position of a handle 22 relative to a vehicle frame.21 (see FIG. 2), which is similar to the second preferred embodiment in construction except that the rod body 52 of the control rod 5 is formed with a projection. The projection is formed with two vertical side surfaces 525 and a cam surface that is disposed between the vertical side surfaces 525 and that constitutes the pressing face 522. The release face 521 is shaped as a curved surface that has a uniform curvature radius, that is aligned with the pressing face 522 along a transverse direction of the control rod 5, and that has two opposite sides which are connected respectively to two opposite sides of the pressing face 522. The pressing face 522 has a central portion that is formed with a circular cavity 524 which engages the ball 7.

With this invention thus explained, it is apparent that numerous modifications and variations can be made without departing from the scope and spirit of this invention. It is therefore intended that this invention be limited only as indicated by the appended claims.

I claim:

1. A handle-adjusting device for adjusting position of a handle relative to a vehicle frame, the handle including an upright support rod connected pivotally to a front end of the vehicle frame at a lower end thereof, and a handlebar connected fixedly to an upper end of the support rod, said handle-adjusting device comprising:

a mounting seat adapted to be connected pivotally to and disposed adjacent the support rod;

an upright valve cylinder including:

a cylinder body having a lower end adapted to be connected pivotally to the vehicle frame, a movable rod disposed axially and movably within said cylinder body and having an upper end that projects upwardly from said cylinder body and that is connected fixedly to said mounting seat, and a valve rod disposed axially and movably within said movable rod and having an upper end that projects upwardly from said movable rod, said valve rod being movable relative to said movable rod between a retracted position, where said movable rod can move within said cylinder body, and an extended position, where said movable rod is fixed relative to said cylinder body, said valve rod being biased to said extended position;

a control rod having an end portion that is disposed within said mounting seat and that is formed with a pressing face and a release face, said control rod being operable on said mounting seat to align said upper end of said valve rod with a selected one of said pressing face and said release face of said control rod, said valve rod being disposed at said retracted position so as to enable rotation of the handle relative to the vehicle frame when said pressing face of said control rod is aligned with said upper end of said valve rod, said valve rod being disposed at said extended position so as to prevent rotation of the handle relative to the vehicle frame when said release face of said control rod is aligned with said upper end of said valve rod;

said mounting seat has an intermediate hole formed therethrough so as to permit extension of said end portion of said control rod therethrough, a bottom surface, and a lower hole that has an upper end communicated with said intermediate hole, and a lower end formed in said bottom surface, said upper end of said valve rod extending into said lower hole in said mounting seat; and said control rod is movable within said intermediate hole in said mounting seat, said pressing face and said release face being annular and being arranged one behind the other, said pressing face having a diameter larger than that of said release face.

2. The handle-adjusting device as claimed in claim 1, wherein:

said mounting seat has a front surface;

said control rod is formed with an outward flange at a front distal end thereof, and an externally threaded rear end, said outward flange having a rear side surface abutting against said front surface of said mounting seat so as to prevent rearward removal of said control rod from said intermediate hole in said mounting seat; and said handle-adjusting device further comprising a T-shaped knob that has an internally threaded front end which engages said externally threaded rear end of said control rod, said knob being sized so as to prevent said knob from moving into said intermediate hole in said mounting seat.

3. The handle-adjusting device as claimed in claim 1, wherein said control rod is further formed with a frusto-conical face that is disposed between and that interconnects said pressing face and said release face.

4. The handle-adjusting device as claimed in claim 1, further comprising a ball that is disposed within said lower hole in said mounting seat between said upper end of said valve rod and said control rod, said upper end of said valve rod being biased to press said ball against said control rod.

* * * * *